Dec. 15, 1964   O. SILBERG ETAL   3,161,218
STRAP-ON TIRE CHAIN
Filed May 24, 1963
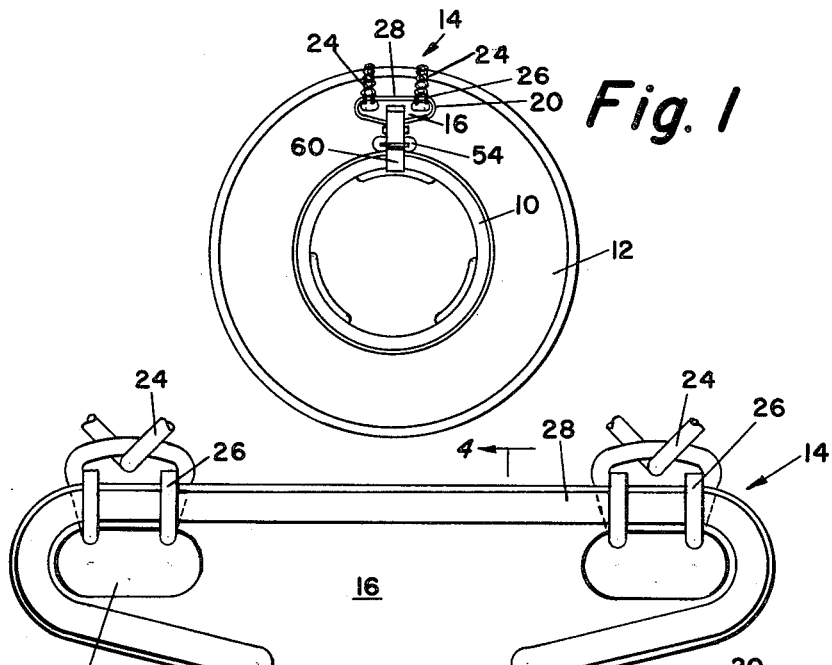
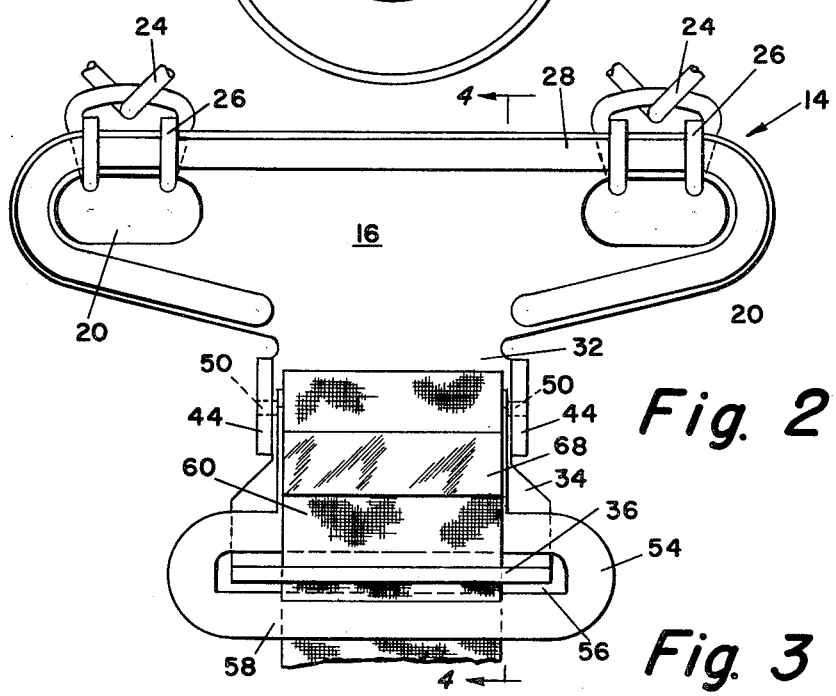
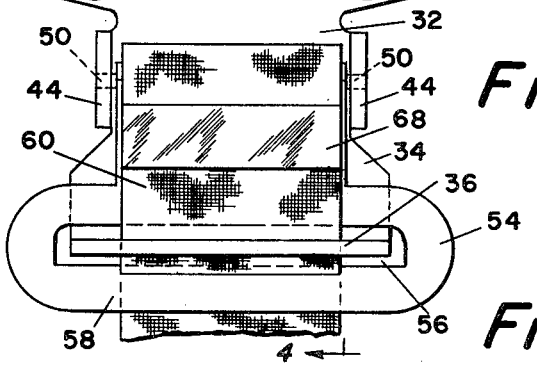
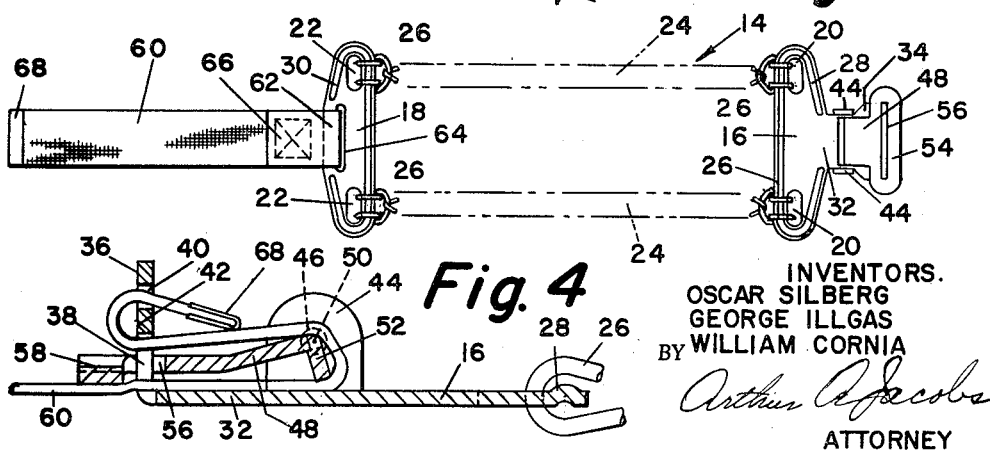
INVENTORS.
OSCAR SILBERG
GEORGE ILLGAS
WILLIAM CORNIA
BY
Arthur A. Jacobs
ATTORNEY 3,161,218
STRAP-ON TIRE CHAIN
Oscar Silberg, 727 E. Sharpnack St., Philadelphia 19, Pa.;
George M. Ilgas, 11718 Millbrook Road, Torresdale,
Philadelphia 14, Pa.; and William Cornia, 160 Brown
St., Philadelphia 23, Pa.
Filed May 24, 1963, Ser. No. 283,020
5 Claims. (Cl. 152—237)

This invention relates to tire chains for improving the traction of automotive vehicles on snow, ice, mud and the like, and it particularly relates to a strap-on type of tire chain which can be applied directly to a tire without necessity of jacking up the vehicle.

Strap-on type tire chains have heretofore been used, but have never proved quite satisfactory because when sub-rotational pressure was placed on the chain during rotation of the wheel, the straps tended to loosen and slip.

Various attempts have heretofore been made to solve the problem of slippage including the provision of ribs on the chain-supporting plates to frictionally engage the side walls of the tire. However, it was found that when the tire hit a bump, rock or other obstruction, the obstruction often jarred the latch open and the chain unit fell off.

It is one object of the present invention to overcome the aforementioned difficulties by providing a strap-on type chain unit which not only frictionally grips a tire tightly enough to eliminate slippage but which is secure against opening of its latch mechanism regardless of the roughness of the terrain over which the vehicle is travelling.

Another object of the present invention is to provide a strap-on chain unit of the aforesaid type which is simple in construction, inexpensive to manufacture and easy to apply and remove.

Other objects and many of the attendant advantages of this invention will be readily appreciated as the same becomes better understood by reference to the following description when read in conjunction with the accompanying drawings wherein:

FIG. 1 is a front elevational view of a vehicle wheel having a tire on which is mounted a tire chain unit embodying the present invention.

FIG. 2 is an enlarged, detailed, front elevational view of the clamping mechanism of the unit of FIG. 1 and its supporting plate, the clamping mechanism being shown securing one end of the strap in place.

FIG. 3 is a top plan view of the chain unit of FIGS. 1 and 2 in open position.

FIG. 4 is a side elevational view of the clamping mechanism with the clamp in the closed position.

Referring now in greater detail to the various figures of the drawing wherein similar reference characters refer to similar parts, there is shown a wheel 10 having a tire 12 thereon. Mounted on the tire 12 is a strap-on chain unit, generally designated 14, embodying the present invention.

The unit 14 comprises a pair of laterally elongated, generally oval-shaped metal plates 16 and 18, each provided with a pair of oppositely-disposed slots, as at 20 in plate 16 and 22 in plate 18. Extending between the plates 16 and 18 are a pair of laterally-spaced chains 24, each of which is provided with a hook 26 at each end. The hooks 26 are engaged in corresponding slots 20 and 22. The plate 16 is provided with a rib 28 which extends adjacent the entire peripheral edge of the plate except for a portion at the center of the outer edge thereof. A similar rib 30 extends in a similar fashion adjacent the entire peripheral edge of the plate 18 except for the outer central portion thereof. These ribs 28 and 30 form grooves on the opposite sides of their respective plates and the edges defining these grooves form ribs which provide strong frictional engagement with the tire wall when the unit is strapped thereon.

At the outer central area where the rib 28 stops short, the plate 16, which constitutes a locking plate, is provided with a forwardly extending, integral, horizontal support flange 32 having a widened horizontal portion 34 at its free end. The portion 34 is itself integral with an upstanding vertical locking flange 36 at its free end (note FIG. 4). The vertical flange 36 is provided with a laterally-elongated lower slot 38 and a similar upper slot 40 vertically spaced from the lower slot 38 by a bar 42.

Integral with the opposite longitudinal edges of the horizontal flange 32 are a pair of upstanding ears 44 provided with bearing apertures 46. A lever 48 is pivotally mounted on the flange 32 by means of laterally-extending lugs 50 integral with and extending laterally from a substantially perpendicular clamping lip 52 integral with the inner end of the lever 48. If desired, the apertures 46 may be slightly offset from each other or the lugs 48 may be slightly offset from each other so that the lip 52 is slanted somewhat in the horizontal plane, whereby when the lever is lowered, one portion of the lip engages the strap before the other and acts as a fulcrum until the other portion is engaged, at which time the first portion is slightly raised. This provides an effective engagement immediately upon moving the lever down to prevent sliding of the unit on the tire while the fastening of the unit on the tire is completed and, at the same time provides a certain amount of lateral play between the clamping lip and the strap to take up any sudden tension without snapping. However, it is also within the scope of the invention to align the apertures and pivot lugs without any slanting.

The lever 48 consists of two longitudinally offset sections (as best seen in FIG. 4), and is provided at its free end with a generally oval-shaped extension 54 having an elongated slot 56 therein. The extension 54 and slot 56 form a latch member for the belt (as hereinafter described). The slot 56, it should be noted, is rounded at the corners of the inner edge and squared at the corners of the outer edge. Furthermore, the outer portion of the latch plate 54 is downwardly offset, as indicated at 58 (and as best seen in FIG. 4). This construction provides clearance to permit the belt to be easily inserted through the lower slot 38 and to be easily bent around to pass through the upper slot 40 (in the manner hereafter described) while the latch plate 54 is in its latching position, and provides a pressure means against the clamped and latched strap (as hereinafter described).

The strap for holding the chain unit on the tire is designated 60 and preferably comprises a strip of fabric belting which is secured to the plate 18 by means of a loop 62 at one end which passes through a slot 64 in the plate 18 and is stitched closed at 66. The free end of the strap 60 is provided with a metal guide tip 68 to facilitate its insertion through the clamp and latch mechanism.

In operation, the unit is mounted on the tire by draping the chains 24 transversely across the upper periphery of the tire so that the chains extend across the tire tread and the plate 16 is along the front tire sidewall while the plate 18 is along the rear sidewall. In this position, the walls defining the grooves formed by the ribs 28 and 30 abut the corresponding sidewalls of the tire. In this connection, it should be noted that it is within the scope of the present invention to provide the ribs instead of the grooves on the underside of the plates and in abutment with the tire sidewalls, the important thing being to provide a firm frictional engagement between the plates and tire.

The strap 60 is then brought down, under and around the tire and wheel rim and its free end is inserted under the clamping lip 52 of the still open lever 48. The strap is then drawn tight so that the edges defining the grooves formed by ribs 28 and 30 are held in tight frictional engagement with their respective tire sidewalls surrounding a slightly pinched portion of the sidewalls within the grooves. The lever 48 is then pivoted down into its lowermost position causing the lip to clampingly engage the strap 60 (as shown in FIG. 4).

As the lever is moved into its lowermost position the slot 56 of the latch member 54 encircles the vertical flange 36 and permits the latch member to slide down over it. The free end of the strap, which extends beyond the clamping lip 52, is then passed sinuously through first the lower slot 38 and then the upper slot 40 of the vertical flange 36 (as best seen in FIG. 4). The loop formed thereby is under tension and acts to press the portion 56 of the latch member down against the strap. This causes the latch member to be locked in place and, at the same time, provides an additional clamping effect on the strap in spaced relationship to the clamping lip 52. The strap is now securely held on the tire and the latch is locked in place.

Despite the secureness of the unit on the tire, it is very easy to remove it since all that is required is the undoing of the loop by passing the free end of the strap out of the slots 38 and 40 and then pushing up on the latch member 54 whereby the clamping effect of the lip 52 is automatically removed and the unit is free to be lifted off the tire.

Obviously many modifications and variations of the present invention are possible in the light of the above teachings. It is, therefore, to be understood that within the scope of the appended claims, the invention may be practiced otherwise than as specifically described.

The invention claimed is:

1. A tire chain unit comprising a pair of flat plates having at least one chain extending therebetween and connected at its ends thereto, one of said plates having a flexible strap extending freely therefrom and the other of said plates being a locking plate and having a clamping and locking means for releasably securing the free end of said strap, said clamping and locking means comprising a pivoted lever having a clamping lip and a latch plate spaced from each other longitudinally thereof, said clamping lip and latch plate being simultaneously movable with said lever into and out of simultaneous clamping and latching positions, a substantially perpendicular locking flange on said locking plate, said latch plate on said lever being slidably engageable with said locking flange during pivotal movement of said lever, a pair of locking slots spaced from each other longitudinally of said locking flange, and said locking slots being constructed and arranged to releasably receive and secure a looped portion of said free end of said strap when said strap is held in clamped and latched position by said clamping lip and said latch plate, said latch plate being provided with an offset portion constructed and arranged to be pressed against said strap by the looped portion of said free end of said strap when said strap is in clamped and latched position.

2. The unit of claim 1 wherein said latch plate is provided with a slot to slidably embrace said locking flange during pivotal movement of said lever, and wherein an edge portion of said latch plate adjacent the slot therein is offset to provide a pressure means on the clamped and latched strap and clearance for passage of the free end of the strap into said locking slots.

3. The unit of claim 1 wherein a hollow rib is provided on each of said flat plates, said rib defining a tire wall engagement means.

4. A tire chain unit comprising a pair of flat plates, each plate having an inner edge and an outer edge, at least one chain extending between the inner edges of said plates and connected at its corresponding ends to said plates, said chain being of sufficient length to transversely wrap around the tread portion of a vehicle tire, one of said plates having a flexible strap extending freely therefrom and the other being a locking plate having a support flange extending outwardly from its outer edge and in substantially the same plane, a locking flange extending substantially perpendicularly from said support flange, a plurality of spaced slots in said locking flange, a clamping lever pivotally mounted on said support flange, a clamping lip on said lever, a latch member on said lever in spaced relation to said clamping lip longitudinally of said lever, a latch slot in said latch member, said latch slot being constructed and arranged to slidably engage said locking flange during pivotal movement of said lever toward and away from a clamping position an offset edge portion along one side of said latch slot, said offset portion being constructed and arranged to be pressed against said strap by the sinuously formed free end of said strap, and the slots in said locking flange being constructed and arranged to releasably receive and sinuously form the free end of said strap after it has been engaged by said clamping lip.

5. The unit of claim 4 wherein each of said flat plates is provided with a hollow rib defining a groove for frictional engagement with the tire wall.

References Cited in the file of this patent

UNITED STATES PATENTS

| | | |
|---|---|---|
| 2,116,745 | Stuller | May 10, 1938 |
| 2,120,656 | Stuller | June 14, 1938 |
| 2,511,527 | Castongay | June 13, 1950 |
| 3,074,453 | Silberg | Jan. 22, 1963 |